United States Patent
Fischer et al.

(10) Patent No.: US 6,811,599 B2
(45) Date of Patent: Nov. 2, 2004

(54) BIODEGRADABLE THERMOPLASTIC MATERIAL

(75) Inventors: Hartmut Rudolf Fischer, Mierlo (NL); Sabine Fischer, Mierlo (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 10/221,438

(22) PCT Filed: Mar. 13, 2001

(86) PCT No.: PCT/NL01/00206
§ 371 (c)(1),
(2), (4) Date: Dec. 9, 2002

(87) PCT Pub. No.: WO01/68762
PCT Pub. Date: Sep. 20, 2001

(65) Prior Publication Data
US 2003/0180524 A1 Sep. 25, 2003

(30) Foreign Application Priority Data
Mar. 13, 2000 (EP) .......................... 00200896

(51) Int. Cl.$^7$ ................................ C08K 3/34
(52) U.S. Cl. .................... 106/287.17; 106/157.71; 106/207.1; 106/208.1; 106/217.2; 106/217.3; 106/217.9; 106/468; 106/486; 106/487; 524/445; 525/69; 525/70; 525/72

(58) Field of Search .................... 106/157.71, 207.1, 106/208.1, 217.2, 217.3, 217.9, 287.17, 468, 486, 487; 524/445; 525/69, 70, 72

(56) References Cited

U.S. PATENT DOCUMENTS

| 4,737,582 A | | 4/1988 | Goldman et al. |
| 4,963,192 A | * | 10/1990 | Dessauer .................. 106/499 |
| 5,858,076 A | * | 1/1999 | Thompson .............. 106/217.3 |

FOREIGN PATENT DOCUMENTS

EP      0 691 381 A1      1/1995

* cited by examiner

*Primary Examiner*—David Brunsman
(74) *Attorney, Agent, or Firm*—Muserlian, Lucas & Mercanti

(57) ABSTRACT

A biodegradable thermoplastic material comprising a natural polymer, a plasticizer and an exfoliated clay having a layered structure and a cation exchange capacity of from 30–250 milliequivalents per 100 grams and a process of preparing a biodegradable thermoplastic material comprising preparing a suspension of clay, combining said suspension with a natural polymer and a plasticizer and extruding the resultant composition at a temperature of 35–200° C.

15 Claims, 3 Drawing Sheets

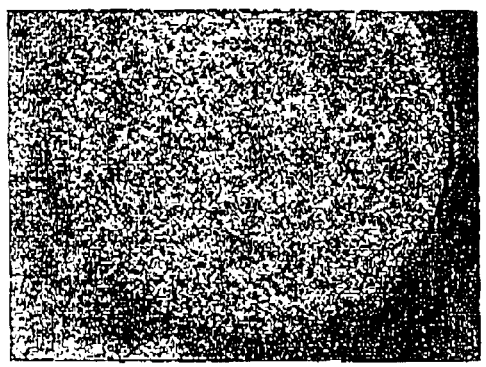 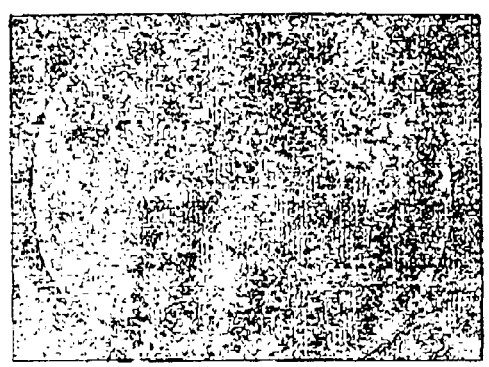
3a) pure thermoplastic starch granulate    3b) starch/clay nano-composite granulate
Figure 3: Hot press moulded films

BIODEGRADABLE THERMOPLASTIC MATERIAL

This application is a 371 of PCT/NL01/00206 dated Mar. 13, 2001.

FIELD OF THE INVENTION

The invention relates to a biodegradable thermoplastic material and to a process for preparing it.

BACKGROUND OF THE INVENTION

Typically, thermoplastic materials have been based on polymers that are synthetically prepared from hydrocarbon or hydrocarbon-like raw materials. They thus find their origin in the petrochemical industry.

SUMMARY OF THE INVENTION

Meanwhile, these materials have become associated with environmental problems. Their production is relatively energy intensive and produces large quantities of carbon dioxide as a side product. Carbon dioxide is often believed to cause, or at least contribute to, global warming. Furthermore, when discarded as waste, these materials degrade only very slowly, which means that they constitute a prolonged burden on the environment.

In order to alleviate these problems, various alternative materials have been developed. These alternative materials have mostly been devised with an eye to their advantageous (bio)degradation profile, when discarded after use. In the context of the invention, a biodegradable material is a material which, in a biological environment, degrades in a relatively short period of time to compounds which are preferably water soluble and non-toxic. The degradation may proceed by hydrolysis under influence of light, air, water and/or micro-organisms.

Most of the known biodegradable thermoplastic materials are either also based on hydrocarbon sources, or based on natural raw materials (monomers) or even natural polymers, such as cellulose, starch, polylactic acid, keratin, and the like. These natural raw materials are, more or less intrinsically, biodegradable. Furthermore, they have the advantage that they originate from renewable sources and will therefore always be available. Natural polymers are, however, generally not thermoplastic. In order to achieve that property, the materials are typically processed (often extruded) in combination with a plasticizer. Of course, the biodegradable properties of a suitable plasticizer are to be considered in its selection.

Unfortunately, in practice there are not many choices for the plasticizer. Usually, either water, urea, glycerol or a low aliphatic or aromatic ester is selected. Problems that are encountered are that these plasticizers either are insufficiently compatible with the biodegradable polymer, or may leach out of the product, which in its turn will become brittle and may even fall apart. This problem is particularly encountered in applications wherein the product is used in a humid or aqueous environment, i.e. when it is brought into contact with water. This disadvantage puts a serious limitation on the applications of the biodegradable thermoplastic material. It moreover means that the (mechanical) properties of the material deteriorate rather fast, making it unsuitable for use long before its biodegradation takes effect.

The present invention seeks to overcome the problems associated with the known biodegradable thermoplastic materials from natural polymers. In particular, it is an object of the invention to provide a material, which is biodegradable and has good thermoplastic and mechanical properties, which material is highly compatible with biodegradable plasticizers. It is furthermore an object of the invention that the favorable properties of the biodegradable thermoplastic material remain apparent over a prolonged period of time, preferably at least until biodegradation affects said properties.

Surprisingly, it has been found that these objects can be reached by incorporating a specific clay into a biodegradable thermoplastic material. Accordingly, the invention relates to a biodegradable, thermoplastic material comprising a natural polymer, a plasticizer and a clay having a layered structure and a cation exchange capacity of from 30 to 250 milliequivalents per 100 gram.

BRIEF DESCRIPTION OF THE DRAWINGS

The invention, together with further objects and advantages thereof, may best be understood by reference to the following descriptions taken in conjunction with the accompanying drawings wherein:

FIG. 3a is a picture of the resulting film, a hot-pressed sheet of pure conventional thermoplastic starch (ThPS) after aging of granulates for 2 hours at room temperature.

FIG. 3b is a picture of the resulting film, a hot-pressed sheet of a starch/clay nanocomposite.

DETAILED DESCRIPTION OF THE INVENTION

Figure 1:
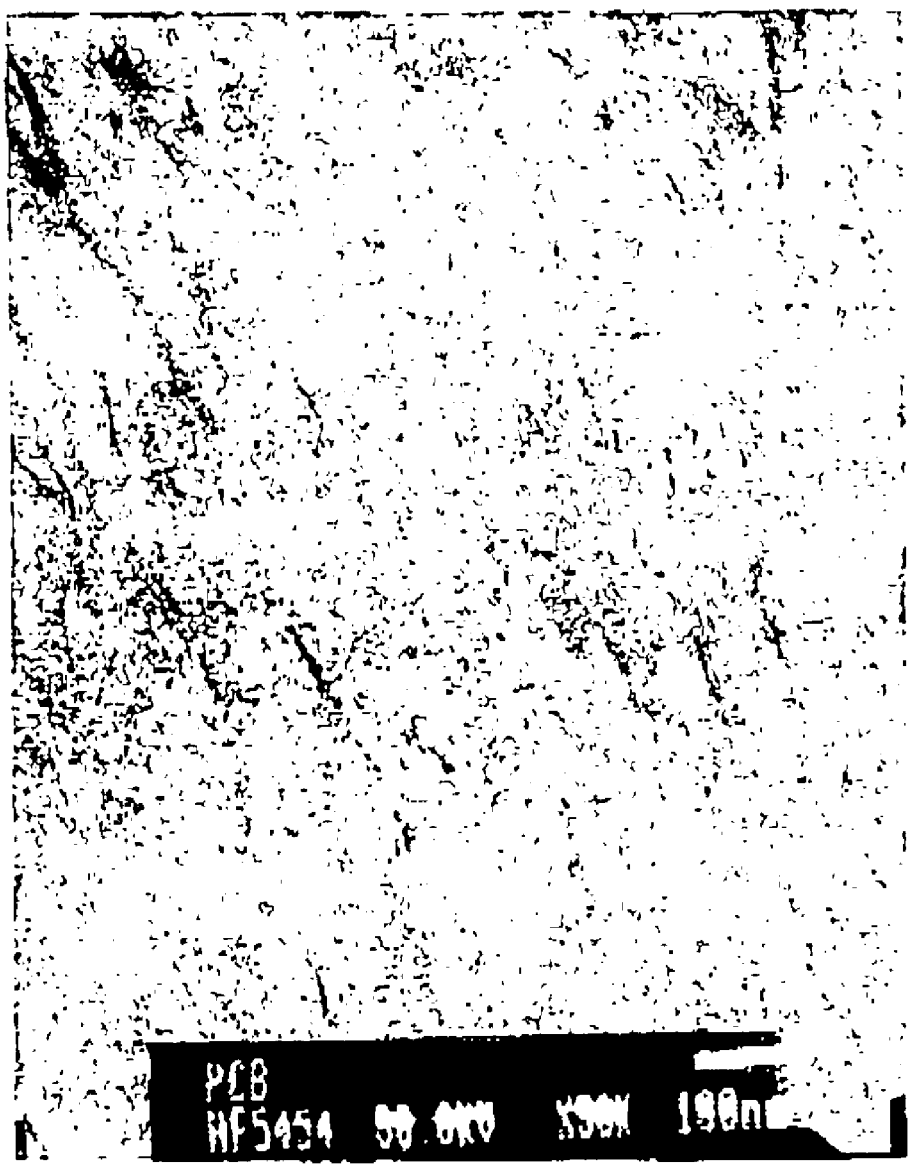
FIG. 1 is a TEM picture of the nanocomposite material.

Due to the presence of the clay, the plasticizer is substantially retained in the biodegradable thermoplastic material, thereby avoiding the problems with loss of plasticizer that were encountered with the known biodegradable thermoplastic materials. Hence, a material according to the invention has superior properties, and those properties are maintained over a prolonged period of time. In other words, the stability of a biodegradable thermoplastic material is significantly improved because of the presence of the clay. In accordance with the invention, a thermoplastic material is a material that is deformable upon increase of temperature.

In the prior art, a combination of a natural polymer, in this case a polysaccharide, and a clay has been disclosed in the German patent application 195 04 899. However, this combination is not a thermoplastic material as no plasticizer is present. Furthermore, the clay is used in combination with the polysaccharide merely in order to control the porosity of the material.

In the European patent application 0 691 381 a biodegradable resin is disclosed containing a biodegradable polymer, such as a polysaccharide, and an inorganic layered compound. In an embodiment for the production of a resin, the inorganic layered compound has been treated with a swelling agent, which is removed after formation of the product. The swelling agent helps to provide inorganic laminar compounds with a very high aspect ratio (i.e. particle size divided by particle thickness) more easily. The swelling agent is removed by drying the resin product at a high temperature (e.g. 2 hours at 80° C. or 10 min at 140° C). Water is claimed to be a suitable swelling agent, because of its relatively low boiling point, which makes removal more easy.

The natural polymer on which the present biodegradable thermoplastic material is based, may be any natural polymer that is conventionally used to serve as bas for a biodegradable thermoplastic material. Examples include carbohydrates (polysacides) and proteins. Particular good results have been obtained using starch, cellulose, chitosan, alginic acid, inulin, pectin, casein and derivatives thereof. Derivatives that may be used are for example esters, such as acetylated starch, or carboxymethylated cellulose, and ethers, such as hydroxypropylated starch.

In accordance with the invention, it has further been found that some of these natural polymers may be used without plasticizer, leading, in combination with the clay, to a biodegradable thermoplastic or thermosetting material. Natural polymers that have been found suitable or preparing a thermoplastic or thermosetting material in accordance with this embodiment are the above mentioned derivatives having a high degree of substitution (DS), typically at least 1. Specific examples include acetylated starch and hydroxypropylated cellulose.

A suitable plasticizer is a compound that is compatible with the other constituents of the material and that is capable of imparting thermoplastic properties to the material. Suitable examples for the plasticizer include water, urea, glycerol, sorbitol ethylene glycol, oligomers of ethylene glycol and mixtures thereof. Preferably, the plasticizer is used in an amount of 15 to 60 wt. %, more preferably of 25 to 45 wt. %, based an the weight of the thermoplastic material. It is an important aspect of the present invention that the added plasticizer is substantially retained in the thermoplastic material after processing. In a preferred embodiment the thermoplastic material comprises a relative amount of at least 15 wt. %, more preferably of at least 20 wt. % and most preferably at least 25 wt. % of plasticizer based on the weight of the thermoplastic material.

A material according to the invention comprises, as stated before, a clay having a layered structure. The clay may be of a natural or synthetic nature. Preferably, the clay has a large contact surface. Typically, the clay will be present in an amount of from 0.1 to 90 wt. %, preferably from 1 to 60 wt. %, based on the weight of the biodegradable thermoplastic material. The amount of clay relative to the amount of the natural polymer may be used as an instrument to adjust the (shear) viscosity of the biodegradable thermoplastic material. An increase in the amount of day may lead to a decrease in the (shear) viscosity.

Very suitable are clay types based on layered silicates, such as layered phyllosilicate composed of magnesium and/or aluminum silicate layers which are each about 7–12 Å in thickness. Especially preferred are smectite-like clay minerals, such as montmorillonite, saponite, hectorite, fluorohectorite, beidellite, nontronite, vermiculite, halloysite and stevensite. These materials impart very favorable mechanical properties and a great heat resistance to a biodegradable thermoplastic material.

A suitable clay type has a cation exchange capacity of from 30 to 250 milliequivalents per 100 gram. When this capacity exceeds the above upper limit, it proves difficult to finely disperse the clay on a molecular level because of the strong mutual interaction of the clay layers. When the cation exchange capacity is lower than the above lower limit, it turns out that the clay is hard to modify, owing to the fact that the interaction with the natural polymer is small. Preferably, a clay having a cation exchange capacity of from 50 to 200 milliequivalents per 100 gram is used.

The biodegradable thermoplastic material may further comprise any conventional additives, such as pigments, stabilizers, processing aids, aroma substances, anti-fouling agents and the like.

Under specific circumstances, it may be desired that the material comprises a compatibilizing agent that assists in providing an optimal combination of the clay and the natural polymer. This possibility will be set forth in greater detail below in the discussion of the preparation of a material according to the invention, to which the invention also pertains.

In order to prepare a material according to the invention, first a suspension of the clay in water and/or another plasticizer is prepared. The suspension will typically contain between 1 and 80 wt. % of the clay. In order to ensure that a highly homogeneous suspension is achieved, the temperature of the water or the plasticizer is preferably between 25 and 60° C. dug the preparation of the suspension.

In a first embodiment, the exfoliated clay as prepared in a suspension as set forth above is mixed with the natural polymer under high shear, preferably in an extruder at elevated temperature. Preferred elevated temperatures are from 35 to 200° C., preferably from 60 to 180° C.

In a second embodiment, the clay in the suspension is ion exchanged with the natural polymer in a molar ratio of the reactive groups at the natural polymer, often OH or $NH_2$ groups, to the cation capacity of the day ranging from 50:1 to 0.5:1. The degree of intercalation/exfoliation can be varied by a change and adjustment of the molecular weight of the natural polymer and the molar ratios of the reacting functional groups of said natural polymer. The thus obtained material may be used as such or in combination with pure natural polymers. In the latter case, it may be desired to carry out an extrusion as mentioned above.

In a third embodiment, particularly when the natural polymer contains hydrophobic groups, such as acetyl, arylcarboxyl or arylcarboxyl ester groups, the exfoliated clay is first ion exchanged with a modifying agent, such as an onium ion. Suitable examples of onium ions include ammonium, phosphonium and sulfonium ions. This modification, which is known for incorporation of clay into other materials, has the goal to compatabilize the layers of the clay with the natural polymer. It utilizes suitable surfactants in an ion exchange reaction. The surfactant should have an onium functionality in addition to a functionality compatible with the natural polymer, such as one or more OH groups, COOH groups and the like. Preferably, the surfactant has from 6 to 16 carbon atoms. The surfactant will typically be employed in an amount of from 5 to 70 wt. %, preferably from 20 to 40 wt. %, with respect to the day.

The above described biodegradable thermoplastic material is suitable for the production of various articles of manufacture. Examples of suitable applications of the material include coatings, films, packaging materials, ever materials, construction materials and the like. The invention accordingly further relates to such articles of manufacture.

The invention will now be further elucidated by the following, nonrestrictive examples.

EXAMPLES

Example 1

A homogeneous mixture (4 g) of 40 w % clay and 60 w % demineralized water is blended in a twin-screw extruder at a temperature of 85–105° C. with a premixed powder consisting of 20 g dry native potato starch, 4.1 g glycerol, and 3.6 g water using a screw speed of 200 rpm. The resulting thermoplastic material shows a complete and homogeneous dispersion of the clay sheets within the starch matrix material (see FIG. 1, which shows a TEM picture of the nanocomposite material as described in this example. A very good dispersion of the clay particles within the matrix material is seen.)

Example 2

A suspension of a montmorillorite (1 g) with an ion exchange capacity of 85 mequ./100 g material, suspended in 300 ml warm (60° C.) water under stirring for about 3 hrs. was given slowly to a slightly acidic (HCl, pH 4) solution of 5 g of chitosan (degree of deacetylation ca. 85%) in 500 ml warm (80° C.) water.

The resulting precipitate was stirred for some time to complete he reaction, filtered and washed with demineralized water unless no chloride ions were any more detectable. The filtered material dried at 80° C. gave a very hard, yellowish solid material. The materials are stiff after drying extremely and not anymore soluble in water and cm be even machined. An analogy to the bone material is obvious since this material is also a composite material.

Figure 2:
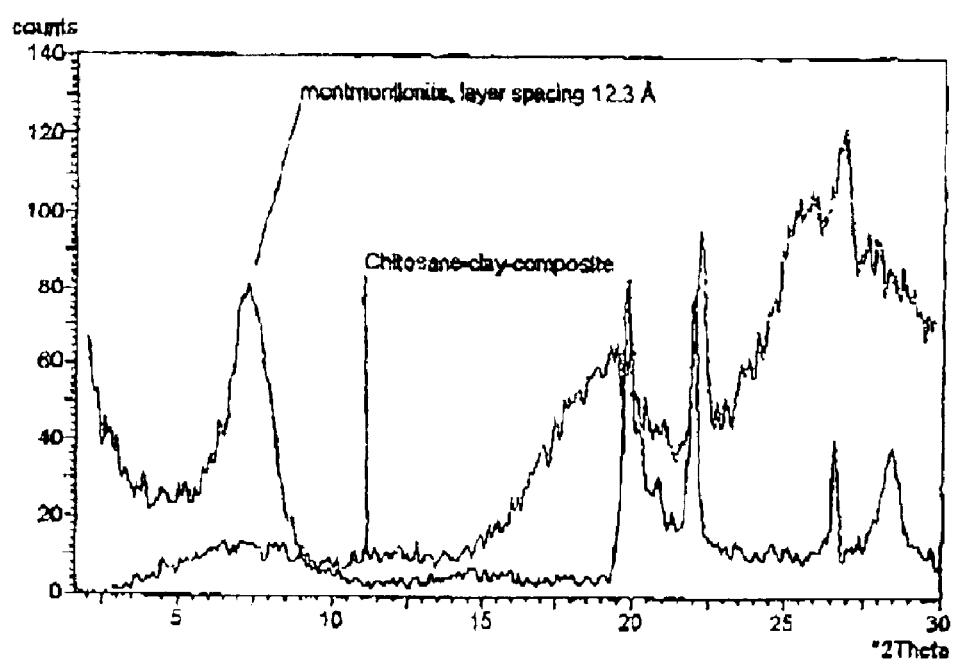
FIG. 2 is a XRD scan of the plain montmorillonite and of a chitosanmonmorillonite nanocomposite showing exfoliation of the clay sheets.

The X-ray diffraction data are shown in FIG. 2, indicating that already substantial exfoliation has occurred. FIG. 2 shows a XRD scan of the plain montmorillonite and of a chitosan-monmorillonite nano-composite showing exfoliation of the clay sheets.

Example 3

Firstly 50 g of clay with a cation exchange capacity (CEC) of 128 meq/100 g is slowly added to 950 ml of warm water (60° C.) while stirring. After approximately 1 hr of stirring, the mixture is sonified in preferably a plastic bottle for a minimum of 2 hrs. Then the solution is allowed to swell for at least 24 hrs. 55 g of cationic starch with a degree of substitution, DS, of 0.3 is diluted in 2.5 l demineralized water and acidified with 11.7 ml concentrated HCl.

The clay suspension is added quickly to the mixture white sting. After approximately 5 minutes, when the reaction is complete, e.g. the precipitate is homogeneous in shape and color; the precipitate is washed until no chlorine can be detected in the filtrate water with an $AgNO_3$ test.

The precipitate was freeze-dried and used for a second mixing step with native potato starch, water and glycerol in an extruder resulting in a completely transparent solid material. The resulting composite material can be very flexible or very hard depending on the starch/plasticizer/clay ratios. The clay platelet distribution in this material was characterized using SEM and show the exfoliation of the smectic material and an homogenous incorporation into the matrix starch polymer.

Example 4

A smectite day mineral (1 g) with an ion exchange capacity of 128 mequ./100 g material was dissolved in 80 ml water, heated up to 80° C. and ion exchanged with 0.33 g a,w-aminododecanic acid dissolved in 50 ml acidified (HCl) water. The resulting precipitate was washed with water, freeze-dried and characterized using XRD. In the X-ray diffraction data is seen that complete ion exchange of the sodium ions against the organic cations has occurred (change of d-spacing from 12.4 Å to 17 Å). A coextrusion of the intercalate of the organic cation with the clay and of native potato starch as a matrix material together with plasticizer leads to a thermoplastic composite material with homogeneously dispersed, exfoliated platelets. This has been proved again by XE, TEM and SEM. All methods show partial up to complete exfoliation of the clay material and a homogeneous incorporation into the matrix polymer.

Example 5

Sheets were made from the material described in Example 1 by compression molding (temperature=90° C., pressure=15 bar). Additionally, a comparing experiment was made using thermoplastic starch (ThPS), without nano-dispersed day, comprising 66 wt. % starch, 15 wt. % glycerol, 19 wt. % water, 5 wt % clay, prepared in an extruder with a temperature profile of 30° C.–70° C.–90° C.–95° C.–100° C., with 10–100 rpm. Pictures of the resulting films are shown in FIGS. 3a and 3b.

FIG. 3a shows a hot-pressed sheet of pure conventional thermoplastic starch (ThPS) after acing of granulates for 2 hours at room temperature. Storage in air for only a few hours after the extrusion of ThPS already resulted in significant loss of water out of the starch matrix. Due to the loss of water, acting as a plasticizer, the material became very hard and brittle and did not behave like a real thermoplast anymore. No sheet could be made. Re-processing was not possible since the glass transition temperature had risen due to the loss of plasticizer. Hot-press sheets of pure ThPS (34 wt. % plasticizers glycerol and water) could be prepared only if the thermoplastic granulate was used directly after the extrusion process for a compression molding step. The resulting sheets were tested in a tensile testing apparatus (Zwick) using a test speed of 10 mm/min and showed a strength of about 25 MPa, but the properties changed quickly because of aging. After only a day, the sheet had become very brittle and had lost its flexibility.

FIG. 3b shows a hot-pressed sheet of a starch/clay nanocomposite according to the invention. This material remained processable for days or even weeks after preparation of the nanocomposite granulate via melt extrusion. The nano-composite sheet was flexible, tough and transparent due to retention of plasticizer (water) in the film. This retention was measured quantitatively by TGA (thermogravic analysis) after several re-extrusion steps. The remaining water after heating the sample quickly to 110° C. and holding it at this temperature was stable around 13%. The same tendency has been noticed qualitatively for glycerol as plasticizer. Nanocomposite films containing glycerol as plasticizer display a drier surface compared to a more sticky surface of films made from pure ThPS. The measured strength was about 40 MPa. The film properties did not alter after storage for several weeks.

Furthermore it was found that in comparison to conventional thermoplastic starch, during the formation of an article according to the invention conditions were less critical, to allow formation of an amorphous thermoplastic material. For example in an extrusion process for conventional thermoplastic starches the processing parameters, e.g. geometry and speed of a spindle were known to be of great impact on starch processing. The higher the shear forces, the better the starch destructurized. However, such shear forces produce extra heat (mechanical energy), resulting in increased evaporation of water (acting as a plasticizer).The viscosity of the melt increased and the extrudates became very brittle. Even worse, the extrusion process could fail completely because of a too high viscosity. So the extrusion parameters (temperature, screw geometry and speed, shear force, time of extrusion) had to be adjusted to receive an amorphous conventional thermoplastic starch (100% destructurization).

The procedure described above to prepare ThPS is quite difficult; the pressure and the forces in the extruder may vary substantially within very short lapses of time. It was found that the clay also acts as a very effective processing aid, making the gelatinization of native starch a lot easier. As a result, the extrusion process was found to become smooth and thus more controllable. Furthermore, the gelatinization, which is never complete when processing pure native starch, was found to occur much quicker and completely at lower temperatures. Use of processing aids like $TiO_2$ or $SiO_2$ is not necessary anymore.

Furthermore it was found that quick aging due to evaporation of plasticizer (water) made conventional thermoplastic starch unsuitable for most of the "normal plastics" applications. At low plasticizer content the material was glassy and brittle because of the low mobility of the starch molecules. At high plasticizer content the interaction forces between the polymers decreased and plastic flow occurred making the materials flexible and rubbery, but tough. With even more plasticizer, ThPS behaved more like a gel. The material properties became poor (weak, soft) with a quick uptake of water at high humidity. The properties of nano-dispersed clay sheets according to the invention substantially.

What is claimed is:

1. A biodegradable thermoplastic material comprising a natural polymer, a plasticizer and an exfoliated clay having a layered structure, said clay having a cation exchange capacity of from 30 to 250 milliequivalents per 100 grams.

2. The material of claim 1, wherein the cation exchange capacity is from 50 to 200 milliequivalents.

3. The material of claim 1, wherein the clay is a smectite clay mineral.

4. The material of claim 1, wherein the clay is present in an amount of from 0.1 to 90 wt. %, based on the weight of the biodegradable thermoplastic material.

5. The material of claim 1, wherein the natural polymer is a carbohydrate or a protein.

6. The material of claim 5, wherein the natural polymer is chosen from the group consisting of starch, cellulose, chitosan, alginic acid, inulin, pectin, and combinations thereof.

7. The material of claim 1, wherein the plasticizer is selected from the group consisting of water, glycerol, ethylene glycol, an oligomer of ethylene glycol and combinations thereof.

8. The material of claim 1, wherein the plasticizer is present in an amount of 15 to 60 wt. %, based on the weight of the biodegradable thermoplastic material.

9. An article of manufacture comprising a biodegradable thermoplastic material according to claim 1.

10. A process for preparing a biodegradable thermoplastic material according to claim 1, comprising preparing a suspension of the clay in water and/or another plasticizer, and extruding the suspension together with the natural polymer and the plasticizer at a temperature of from 35 to 200° C.

11. A process according to claim 10, wherein the suspension of the clay is heated before extrusion to a temperature of up to 60° C. in order to exfoliate the clay.

12. A process according to claim 10, wherein the clay suspension is ion exchanged with at least part of the natural polymer.

13. A process according to claim 10, wherein the clay suspension is ion exchanged with a modifying agent, the modifying agent being a surfactant having from 6 to 16 carbon atoms, a functionality compatible with the natural polymer and an ammonium, phosphonium or sulfonium group.

14. A method of improving the stability of a biodegradable thermoplastic material containing a natural polymer and a plasticizer, comprising:

a) preparing a suspension of clay having a cation exchange capacity of from 30 to 250 milliequivalents per 100 grams in water, said suspension optionally containing a plasticizer;

b) combining said suspension with a natural polymer and a plasticizer; and c) extruding the resultant composition at a temperature of between 35 and 200° C.

15. The method of claim 14, wherein said claim is exfoliated.

* * * * *